May 7, 1968   P. J. VAUGHAN   3,381,444
METHOD OF WRAPPING AN ARTICLE IN A PLASTIC FILM
Filed Feb. 23, 1965

INVENTOR.
PAUL J. VAUGHAN
BY
Oldham & Oldham
ATTYS.

United States Patent Office 3,381,444
Patented May 7, 1968

3,381,444
METHOD OF WRAPPING AN ARTICLE IN A PLASTIC FILM
Paul J. Vaughan, Cuyahoga Falls, Ohio, assignor, by mesne assignments, to Filmco, Inc., Aurora, Ohio, a corporation of Delaware
Filed Feb. 23, 1965, Ser. No. 434,592
6 Claims. (Cl. 53—33)

ABSTRACT OF THE DISCLOSURE

A method of wrapping an article in a heat sealable, resilient plastic film to produce a package wherein the film wrapper is under tension along both the longitudinal and transverse axes, by stretching the wrapper in the longitudinal direction and sealing the stretched wrapper adjacent the longitudinal margins of the article, then stretching the wrapper in the transverse direction and sealing the stretched wrapper adjacent the transverse margins of the article.

---

The present invention relates to the packaging art, and particularly to a method of wrapping an article in a heat sealable, resilient, plastic film in such a manner that the plastic film is under both longitudinally directed and transversely extending tensional forces in the completed package.

Heretofore there has been an extensive use of various types of plastic films, usually transparent, in enclosing articles for storage and sale purposes. Such plastic film has been widely used in packaging red meats, for example, and it always is important that the packaged article be presented in an attractive enclosure that is formed from suitable material available at low cost. It also is necessary that the packaging method be readily performed so that an inexpensive packaging method also is provided to present the packaged article in a transparent enclosure at a minimum expense per package since many of these packages are prepared in large numbers. It furthermore is very desirable that the transparent plastic film enclosing the article be adapted to have inherent resilience in the film so that if local deformations are made in the film after the package has been formed, such enclosure film will retract rapidly, or take up the local deformation so that an attractive, durable package still will be provided. These packages frequently are displayed on open counters for sales purposes and the package must remain attractive and completely enclosed for any reasonable length of display time.

The general object of the present invention is to provide a novel and improved method of packaging articles in heat sealable, resilient, transparent plastic films, which packaging method is characterized by the provision of a packaged article wherein the packaging film is retained in the packaged article under both longitudinally and transversely directed tensional forces.

Another object of the invention is to modify present packaging methods wherein a transparent plastic film is secured around an article under longitudinally directed tensional forces by thereafter tensioning the enclosure film in a transversely extending direction under which condition excess transversely extending, or the lateral marginal portions of the film are cut from the package and the film is permitted to retract into tight engagement with opposed lateral margins of the package while the film is still maintained under transversely extending tensional forces by the positioning of the heat sealed edges or cut portions of the film in relation to the initial relationship of such film with the packaged article.

A further object of the invention is to provide an initial wrapping of a plastic film around a package under longitudinal tensional forces in the plastic film, and then thereafter appreciably tensioning and/or stretching the plastic film in a transversely extending direction by engaging marginal portions of the film and then severing the excess lateral portions of the film by longitudinally extending cuts in portions of the film that were initially extending over and/or under the packaged article and thereafter releasing the tensional forces on the plastic film whereby the cut edges thereof will retract against the packaged article but will maintain the plastic film under transversely extending tensional forces.

Another object of the invention is to provide a novel and improved method for packaging articles so that an attractive, durable packaged article has been provided at relatively inexpensive cost.

The foregoing and other objects and advantages of the invention will be made more apparent as the specification proceeds.

Reference now is made to the accompanying drawings, wherein.

When referring to corresponding members shown in the drawings and referred to in the specification, corresponding numerals are used to facilitate comparison therebetween.

Generally speaking, the method of the invention relates to the steps of wrapping an article in a heat sealable, resilient, transparent plastic film so as to provide an attractive article in which the plastic film is maintained under tensional forces on both axes of the film, and which method includes the steps of pulling an elongate strip of plastic film longitudinally and wrapping it snugly under longitudinally directed tensional forces around the top and bottom of the article, which film encloses the article and extends laterally therebeyond and with the film being overlapped at portions of the film enclosing the article, cutting the film transversely adjacent the article, tensioning the film in a transverse direction and bringing the top and bottom film layers together, cutting the film longitudinally adjacent each lateral margin thereof in portions of the film initially over and/or under the packaged article, heat sealing the layers of film together for the entire length thereof to enclose the sides of the article, and releasing the film to enable it to draw back into snug engagement with the sides of the packaged article.

Figure 1:
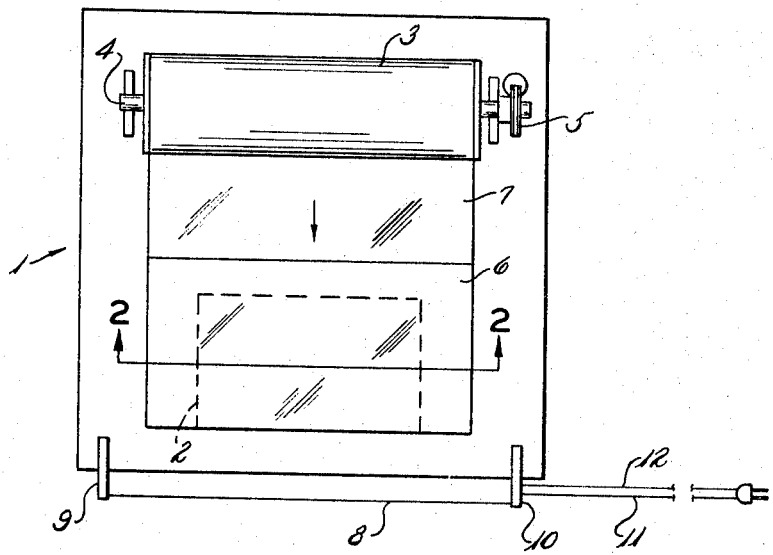
FIG. 1 is a plan of one type of apparatus for performing the initial step or steps of the novel method of the invention.

For a better understanding of the invention, reference now is directed to the details of the apparatus and method steps as shown in the accompanying drawings. In FIG. 1, a substantially conventional apparatus 1 is shown, which apparatus 1 is provided for use in wrapping plastic film about an article and providing heat sealing and/or cutting actions on the plastic film. Thus, an article 2 is shown and a roll of plastic film 3 is suitably journalled on or supported by the apparatus 1. This film 3 is shown provided with a positioning shaft 4 that is carried by the apparatus 1, and with some suitable brake means 5, or equivalent member being shown in operative engagement with the shaft 4. Thus the brake means 5 is adapted to set up sufficient resistance to rotation of the shaft 4 as to require some longitudinally extending tension to be exerted upon the strip of plastic film 3, as it is drawn from the roll of plastic film. This apparatus 1 of the invention is of the type which is usually manually operated and with the operator placing the article 2 over a section of the film 3 that has been drawn from the roll of film 3. Next the operator maintains longitudinally extending tension upon the strip of plastic film 3 while he pulls more film from the roll 3 and wraps the article 2 within top and bottom layers 6 and 7 that he forms around the article 2 by turning the article 2 about its tranversely extending axis. Initially the top of the article 2 usually would be placed against an exposed length of the plastic film 3 and then the additional film is pulled from the roll of plastic film, as previously described. Then the operator would draw the enclosed article a further distance from the roll of plastic film 3 until the continuous strip of film extending from the article 2 would be immediately adjacent a conventional type of a cutter wire or bar 8. This cutter wire or bar 8 is positioned upon suitable supports 9 and 10 that are affixed to the apparatus 1 and with conventional power supply leads 11 and 12 being connected to the cutter wire or bar 8 so as to heat it rapidly to a suitable temperature by which a rapid and substantially instantaneous cutting and sealing action can be performed on the plastic film 3 by the film strip being moved into temporary engagement with the cutter wire 8. Usually the cutting of the strip of plastic film 3 is effected at a portion of the plastic film immediately adjacent the trailing edge of the aritcle 2 whereby the heated and cut plastic film is immediately adjacent other layers of the plastic film enclosing the article 2 so that a heat seal action of the cut plastic film strip acts to bond it to the adjacent layers of the film that tightly enclose the article 2 in a longitudinally extending direction. Also, the plastic film is of the type that clings to itself readily and this aids in attaching the cut film margin to adjacent portions of the film.

Figure 2:
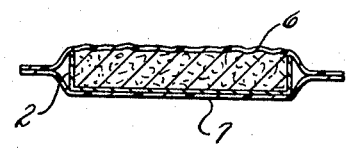
FIG. 2 is a fragmentary cross section taken on line 2—2 of the article being enclosed in a package and showing it in the condition during or after the first step in the method of the invention.
Figure 3:
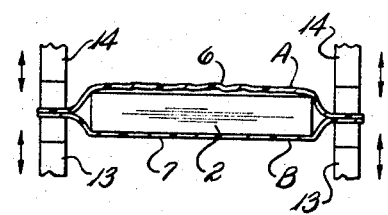
FIG. 3 shows typical apparatus for engaging opposed lateral marginal portions of the plastic film that are in association with the packaged article.

It will be noted that the plastic film 3 is of sufficient initial width that it will overlap the lateral margins of the article 2 and that a plurality of layers of the plastic film are formed that extend an appreciable distance laterally beyond the packaged article 2, as shown in FIG. 2.

In making the article of the invention by the packaging method described, any suitable plastic film can be used, particularly those of the resilient, transparent type and which have the facility or property of great attraction or adhesion between adjacent layers or portions of the film that are brought into contact with each other. These films can be made from polyvinyl chloride resins, or the like. The plastic in the film is in a soft, plasticized, unoriented form in the plastic film forming the roll of plastic film 3.

Figure 4:
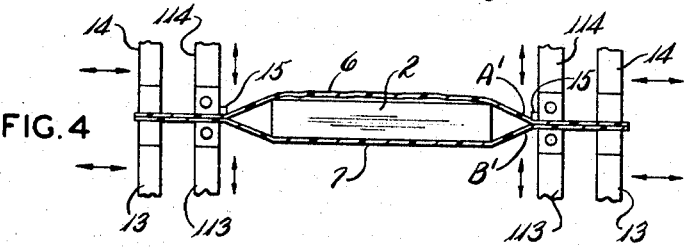
FIG. 4 is a fragmentary vertical section of the apparatus of FIG. 3, but showing it after transversely extending tensional forces have been set up in the plastic film.
Figure 5:
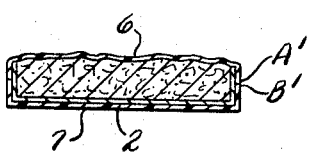
FIG. 5 is a vertical section through the packaged article of the invention upon the completion of the method of the invention.

FIG. 4 of the drawings best shows that any suitable members, such as pairs of clamp rods or bars 13 and 14, are provided in the apparatus of the invention and are adapted to have controlled vertical movement so that a set of each of these clamp bars 13 and 14 can be brought into engagement with the free lateral margins of the top and bottom layers 6 and 7 of the plastic film and engage the film tightly. Then these clamp bars 13 and 14, or each set of the clamp means provided, is so positioned in the apparatus of the invention that an appreciable lateral tensioning of the layers 6 and 7 of the plastic film can be provided by stretching this plastic film when clamped between each set of the clamp bars 13 and 14. Thus, for instance, in a packaged article that may, for example, be about 8 inches wide, the clamp bars 13 and 14 would each be provided with a lateral movement of, for example, about 2 inches, after being brought into clamping engagement with the plastic film layers 6 and 7 immediately adjacent the opposed lateral margins of the article 2. The drawings are diagrammatic and not necessarily to scale on the act of stretching the film. As a further feature of the invention, a second set of clamp bars or means 113 and 114 are brought into engagement with the layers 6 and 7 after they are tensioned. Such clamp bars 113 and 114 each have a conventional hot wire, or cutter 15 associated therewith. In the use of these hot wires 15, it is conventional that the wire be cold when initially brought into engagement with the material to be severed, but at any desired time the cutter wire can be energized and it almost instantaneously reaches a suitable temperature for cutting and heat sealing the layer or layers of plastic film with which it is associated. The cutters 15 may aid in bringing the top and bottom layers of the film into contact. In the drawings, the cutters or bars 15 are shown on the laterally inner portions of the clamp bars 113, but such cutters can be associated with the laterally outer portions of these clamp bars, if desired. The clamp bars 113 and 114 are shown of exaggerated widths or thicknesses and may be appreciably narrower laterally than shown diagrammatically in the drawings. In all events, the clamp bars 113 and 114 will bring the associated tensioned and/or stretched top and bottom layers 6 and 7, respectively, in to contact with each other, and then at any desired time, the cutters 15 will be energized to provide the desired cutting and simultaneous heat sealing action between adjacent portions of the layers 6 and 7. If desired, the layers 6 and 7 may be retained in continued association with each other for a few seconds, if the cutters 15 are on the laterally outer portions of the clamps, to permit the heat sealing action to be carried to completion with resultant solidification of the adjacent portions of the layers. The clamp bars 113 and 114 may be water cooled, if desired.

FIG. 4 best shows how the layers of film 6 and 7 are stretched by the clamp bars 13 and 14 or similar means so that points A and B on the film and over the container, as the film is applied, are drawn to be laterally spaced from the container. The cutters 15 may act upon such area or section of the film represented by the new positions A' and B' of the portions A and B of the film layers, as stretched in the process of the invention.

In all events, the layers 6 and 7 of the plastic film have been so tensioned and/or stretched transversely that the action of the cutters 15 is such and the cutters 15 are associated with portions of the plastic film that, prior to the transverse stretching of the layers of plastic film, were either over or under the packaged article 2. When the clamp bars 113 and 114 are released, or the film is cut, the inherent resiliency of the plastic material forming the layers 6 and 7 of the plastic film will cause the plastic film to draw back into snug engagement with the lateral margins of the packaged article 2 to retain the plastic in the layers 6 and 7 in transversely directed tension as well as under the initial longitudinally extending tensional forces provided in the packaged article. Hence, it is believed that a novel and improved method has been provided for inexpensively forming a packaged article from a transparent, resilient heat sealable film. Any suitable apparatus can be used in practice of the invention. For example, the film 3 can be longitudinally tensioned and wrapped around the packaged article with any desired overlap of the film upon itself, and the package could be pressed against a heat seal plate to secure the layers of film together. Then the film could be cut from the roll in any conventional manner. The method can be rapidly and easily performed by substantially conventional apparatus in combination with some manual control of the packaged article so that it is believed that the objects of the invention have been achieved and a novel and improved film wrapped package has been obtained.

While one complete embodiment of the invention has been disclosed herein, it will be appreciated that modification of this particular embodiment of the invention may be resorted to without departing from the scope of the invention as defined in the appended claims.

What is claimed is:

1. A method of wrapping an article in a heat sealable, resilient plastic film comprising the steps of enclosing an article in a sheet of plastic film while stretching the plastic film in a longitudinal direction, which plastic film extends transversely from the article in both directions, cutting the plastic film transversely and securing adjacent layers of the film together adjacent the longitudinal margin of the article to retain the plastic film in longitudinally extending tension, grasping the opposed transversely extending portions of the plastic film, stretching the plastic film in a transverse direction, and cutting the stretched plastic film longitudinally adjacent each transverse margin of the article and heat sealing the edges of the cut film together, which film is resilient and retracts into tight engagement with opposed lateral margins of the article, the retracted film being under longitudinal and transverse tension.

2. A method of wrapping an article in a heat sealable, resilient plastic film comprising the steps of enclosing an article in a sheet of plasticized polyvinyl chloride film while stretching the plastic film in a longitudinal direction, which plastic film extends transversely from the article in both directions, cutting the plastic film transversely and sealing the edge of the film to another portion of the film adjacent the longitudinal margin of the article, stretching the plastic film in a transverse direction, and cutting the tensioned plastic film longitudinally adjacent each lateral margin of the article and heat sealing the edges of the cut film together, which film is so tensioned and the cuts are so positioned that the film retracts into tight engagement with opposed lateral margins of the article, the retracted film being under longitudinal and transverse tension.

3. A method of wrapping an article in a heat sealable, resilient plastic film comprising the steps of stretching an elongate strip of plastic film longitudinally and wrapping it snugly around the top and bottom of an article, the film enclosing the article and extending laterally therebeyond, cutting the film transversely and securing it around the package under longitudinally extending tension, stretching the film in a transverse direction and bringing the top and bottom layers thereof together, and cutting the film longitudinally adjacent each lateral margin of the article and heat sealing the layers of film together for the entire length thereof to enclose the sides of the articles, the film drawing back into snug engagement with the sides of the packaged article.

4. A method of wrapping an article in a heat sealable, resilient plastic film comprising the steps of pulling an elongate strip of plastic film longitudinally and wrapping it snugly under longitudinally directed tension around the top and bottom of an article, the film enclosing the article and extending laterally therebeyond, the film being overlapped at one portion thereof, cutting the film transversely at the overlapped portion thereof and heat sealing the layers thereof together, stretching the film in a transverse direction and bringing the top and bottom layers thereof together, cutting the film longitudinally adjacent each lateral margin of the article and heat sealing the layers of film together for the entire length thereof to enclose the sides of the article, and releasing the film which draws back into snug engagement with the sides of the packaged article.

5. A method of wrapping an article in a heat sealable, resilient plastic film that has adhesion for itself comprising the steps of pulling an elongate strip of the plastic film longitudinally and wrapping it snugly under longitudinally directed tension around the top and bottom of an article, the film enclosing the article and extending laterally therebeyond, cutting the film transversely, stretching the film in a transverse direction to pull a portion of the film initially over the article beyond a margin of the article, cutting the film longitudinally on each lateral margin of the article in said portion of the film initially over the article and heat sealing the layers of film together at the cut margins of the film for the entire length thereof to enclose the sides of the article, the film drawing back into snug engagement with the sides of the packaged article.

6. A method of wrapping an article in a heat sealable, resilient plastic film comprising the steps of completely enclosing an article in a sheet of plastic film which is tensioned in a longitudinal direction, which plastic film extends transversely from the article in both directions, sealing the film, which is still under longitudinal tension, around the article, stretching the plastic film in a transverse direction, and cutting the tensioned plastic film longitudinally and heat sealing the edges of the cut film together, which film is resilient and retracts into tight engagement with opposed lateral margins of the article, the retracted film being under longitudinal and transverse tension.

References Cited

UNITED STATES PATENTS

| | | | |
|---|---|---|---|
| 2,718,991 | 9/1955 | Rabinowitz | 53—390 X |
| 2,741,885 | 4/1956 | Allison | 53—33 X |
| 2,971,311 | 2/1961 | Messmer | 53—373 |
| 3,191,356 | 6/1965 | Zelnick et al. | 53—182 |
| 3,295,295 | 1/1967 | Stewart et al. | 53—390 |
| 3,309,837 | 3/1967 | Faust et al. | 53—39 |

FOREIGN PATENTS 1,091,477   10/1960   Germany.

TRAVIS S. McGEHEE, *Primary Examiner.*

N. ABRAMS, *Assistant Examiner.*